United States Patent
Ruhlmann et al.

(10) Patent No.: US 9,884,968 B2
(45) Date of Patent: *Feb. 6, 2018

(54) ASSOCIATIVE ACRYLIC THICKENING AGENT CONTAINING POLYGLYCEROLS AND ITS USE TO INCREASE THE OPEN TIME OF THIN OR THICK FILMS

(71) Applicant: COATEX, Genay (FR)

(72) Inventors: Denis Ruhlmann, Genay (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 689 days.

This patent is subject to a terminal disclaimer.

(21) Appl. No.: 14/356,061

(22) PCT Filed: Oct. 4, 2012

(86) PCT No.: PCT/FR2012/052252
§ 371 (c)(1),
(2) Date: May 2, 2014

(87) PCT Pub. No.: WO2013/064761
PCT Pub. Date: May 10, 2013

(65) Prior Publication Data
US 2014/0296432 A1    Oct. 2, 2014

(30) Foreign Application Priority Data

Nov. 4, 2011 (FR) ...................... 11 60004

(51) Int. Cl.
| | |
|---|---|
| *C09D 7/00* | (2006.01) |
| *C09D 133/08* | (2006.01) |
| *C09D 133/10* | (2006.01) |
| *C08F 2/24* | (2006.01) |
| *C08K 5/04* | (2006.01) |
| *C09J 133/08* | (2006.01) |
| *C09J 133/10* | (2006.01) |

(52) U.S. Cl.
CPC ............. *C09D 7/002* (2013.01); *C08F 2/24* (2013.01); *C09D 133/08* (2013.01); *C09D 133/10* (2013.01); *C09J 133/08* (2013.01); *C09J 133/10* (2013.01); *C08L 2201/50* (2013.01)

(58) Field of Classification Search
CPC ........ C08F 18/00; C08F 11/02; C08F 120/02; C08F 120/06
See application file for complete search history.

(56) References Cited

U.S. PATENT DOCUMENTS

| | | | | |
|---|---|---|---|---|
| 5,294,693 A | * | 3/1994 | Egraz ................ | A61K 8/8152 526/310 |
| 6,140,435 A | * | 10/2000 | Zanotti-Russo ..... | A61K 8/8152 524/916 |
| 2009/0239958 A1 | | 9/2009 | Sakanishi et al. | |
| 2011/0107803 A1 | | 5/2011 | Fechner et al. | |
| 2013/0116368 A1 | | 5/2013 | Suau et al. | |
| 2013/0116377 A1 | | 5/2013 | Ruhlmann et al. | |

FOREIGN PATENT DOCUMENTS

| | | |
|---|---|---|
| DE | 10 2007 039 783 A1 | 2/2009 |
| EP | 2 103 674 A2 | 9/2009 |
| JP | 2007056081 * | 3/2007 ............... C08F 2/30 |

OTHER PUBLICATIONS

International Search Report issued Nov. 26, 2012 in PCT/FR2012/052252 (with partial English language translation).
"Polyglycerol-3", Solvay Chemicals, XP002686977, Retrieved from the Internet: URL: http://www.solvaychemicals.com/EN/products/Polyglycerols/Polyglycerol-3.aspx, retrieved on Nov. 13, 2012, 2 Pages.
"Polyglycerol-4", Solvay Chemicals, XP002686978, Retrieved from the Internet: URL: http://www.solvaychemicals.com/EN/products/Polyglycerols/Polyglycerol-4.aspx retrieved on Nov. 13, 2012, 2 Pages.

* cited by examiner

*Primary Examiner* — Ling Choi
*Assistant Examiner* — Thuy-Ai N Nguyen
(74) *Attorney, Agent, or Firm* — Oblon, McClelland, Maier & Neustadt, L.L.P.

(57) ABSTRACT

The present invention relates to new acrylic associative thickening agents which, when polymerized in the presence of particular polyglycerols, ultimately result in an increase of the open time of the paint or of the thick coating in which they are incorporated. By so doing, painters and applicators will have more time to work the paint layers gradually or to correct imperfections such as paint droplets, traces of brushes and filling-knives.

14 Claims, No Drawings

ASSOCIATIVE ACRYLIC THICKENING AGENT CONTAINING POLYGLYCEROLS AND ITS USE TO INCREASE THE OPEN TIME OF THIN OR THICK FILMS

The present invention relates to new acrylic associative thickening agents which, when polymerized in the presence of particular polyglycerols, ultimately result in an increase of the open time of the paint or of the thick coating in which they are incorporated. By so doing, painters and applicators will have more time to work the paint layers gradually or to correct imperfections such as paint droplets, traces of brushes and filling-knives.

In the field of water-based coatings, such as water-based paints, the open time is the period during which the film of the moist paint or of the thick coating, once applied to a surface, can be reworked; it can then be corrected, notably through new applications using a roller, brush or spatula, without surface defects appearing at the end.

In the remainder of the Application, the inaccurate term "open time" of a paint will be used; this expression makes reference to the open time of the thin wet film of the said paint, or of the thick wet film of the said renders, roughcast paints or other thick coatings, after they have been applied on to a medium.

It is understood that in formulations of water-based paints in which water evaporation is a rapid phenomenon (compared to paints containing solvents which can have high boiling points), reducing the open time is an important issue.

With this regard, specific additives, known as "open-time extenders", have been developed by the skilled man in the art, the first of these being ethylene glycol and glycol ethers, mentioned as prior art in "Development of low VOC additives to extend the wet edge and open time of aqueous coatings" (Progress in Organic Coatings, 2011, 72(1-2), pp. 102-108). However, these have the disadvantage that they are solvents, which the water-based paints industry has decided not to use, preferring to focus on VOC-free formulations.

Natural waxes have also been developed (see documents WO 2001036550 A1, WO 2001036549 A1, WO 2008022828 A1 and WO 2009138304 A1): but they require a more complex application method, since they must be melted before being incorporated in the paint formulation; in addition, if insoluble residues remain these can seriously affect the stability of the final paint composition.

Finally, surfactants are currently most in favour (see documents U.S. Pat. No. 5,154,918 A1, US 2011091408 A1 and WO 2011/071510 A1): these are easy to apply, and are VOC-free compounds which enable the open time of water-based paints to be increased, notably through the repulsion effects caused by their hydrophobic groups between the latex particles, which commensurately reduces the phenomenon of water evaporation over time, consequently increasing the open time of the wet paint film (WO 2011/071510 A1).

Independently of their properties, these additives "which increase the open time" constitute an additional ingredient of the water-based paint formulation: the skilled man in the art is then faced with the problems of storage and handling relating to every new product used in its formulation. In addition, it is well known that every new additive can interact with the other constituents of the formulation, and affect some of the final properties of the paint film. The skilled man in the art must then, if applicable, adjust his formulation, taking these negative impacts into account.

For this reason it was sought to increase the open time of the paints, by means of additives which have already been made indispensable in these formulations, but which are known to contribute other properties. This is notably the case of particular products called "associative thickening agents".

In water-based paints, thickening agents enable the rheology of the formulations to be controlled, both during their manufacture, and during their transport and storage, or during their application. The wide variety of practical constraints in each of these stages relates to a multiplicity of different rheological properties.

Nevertheless, the requirement of the skilled man in the art can be summarised as to obtain an effect of the thickening of a water-based paint, both for reasons of stability over time, and for a possible application of the paint to a vertical surface, lack of splashing during use, etc. For this reason the additives which contribute to this regulation of the rheological properties have been designated by the term "thickening agents".

It has been well known for many years that natural thickening agents made of the HEC (hydroxy ethyl cellulose) type help increase the open time. Reference may notably be made, for example, to the technical forms of the products of the Natrosol™ type, sold by the company Aqualon™. However, the thickening properties of these products are only moderate.

The skilled man in the art then considered thickening agents known as "associative" thickening agents. These are water-soluble polymers having insoluble hydrophobic groups. Such macromolecules have an associating character: when introduced into water, the hydrophobic groups tend to assemble in the form of micellar aggregates. These aggregates are linked together by the hydrophilic parts of the polymers: a three-dimensional network is then formed which causes the viscosity of the medium to be increased.

The functional mechanism and the characteristics of the associative thickening agents are now well known and described, for example in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp. 423-442).

And it is now established that certain associative thickening agents enable the open time of paint formulations into which they are introduced to be increased ("Control of rheology of water-borne paints using associative thickeners", Progress in Organic Coatings (1999), 35(1-4), 171-181). This document teaches that an associative thickening agent of a polyurethane or HEUR (Hydrophobically modified Ethylene oxyde URethane) nature, having a determined molecular weight, effectively enables the open time of a water-based paint to be increased.

However, associative thickening agents of the HEUR type have the disadvantage that they are insoluble in water, for commercially acceptable dry extracts: use must therefore be made of surfactants, which complicates their application. The skilled man in the art therefore logically turns to the other major class of acrylic associative thickening agents: HASEs (Hydrophobically Alkali Soluble Emulsions). These can be defined in terms of the monomers which constitute them: the first uses a (meth)acrylic acid base, the second is an ester of this acid, and the third is an associative hydrophobic monomer. As examples, it is notably possible to cite European patent applications EP 0 577 526 A1, EP 1 778 797

A1, EP 2 108 007 A1, EP 2 114 378 A1 and EP 2 303 982 A1, and French patent applications FR 2 950 061 A1 and FR 2 956 862 A1.

However, to our knowledge there is no method in the state of the art able to give HASE-type associative thickening agents an ability to increase the open time of the paint formulations in which they are incorporated. Continuing its research along these lines, the Applicant developed a new method for manufacturing HASE-type thickening agents, using polyglycerols as "polymerization surfactants".

The latter expression means that the said surfactants are used during one of the steps of synthesis of the associative thickening agent. Conversely, "formulation surfactants" are used after polymerization of the said thickening agent, notably in order to use the finished product obtained after polymerization in water.

In connection with the method of manufacture of the HASE thickening agents according to the invention, it is demonstrated that the resulting products enable the open time of a paint to be increased appreciably. A solution resolving the problem of increasing open time, without using an additional additive which causes logistical constraints, is thus available. HEUR-type associative thickening agents, formulation of which is more constrictive to attain commercially attractive dry extracts, are avoided, and it is demonstrated that open times equivalent to those obtained with an HEC are obtained, but with greater thickening power.

The Applicant states that the use of surfactants during polymerization of an acrylic associative thickening agent is already known: it is notably described in document WO 2009 019225 A1. Furthermore, it is already known to use glycerol during the same type of synthesis, as disclosed in document WO 98 06757 A1. Nevertheless, nothing described or suggested that the use of polyglycerols, as polymerization surfactants, was likely to lead to new HASE-type associative thickening agents which would be particularly effective in increasing the open time in water-based paints.

The first object of the invention therefore consists of a method to manufacture an associative thickening agent by polymerization, in an aqueous dispersion, in the presence of surfactants other than the compounds listed in point d):
  a) of at least one monomer which is (meth)acrylic acid, and preferentially methacrylic acid,
  b) of at least one monomer which is an ester of (meth) acrylic acid, and preferentially ethyl acrylate,
  c) of at least one monomer having a hydrophobic group,
characterised in that d) at least one polyglycerol of formula (I) is used during the said polymerization

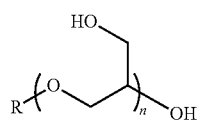

where n represents any number, integer or decimal higher than 1 and equal or lower than 10 and designates the average degree of polymerization; R designates hydrogen, or an ester group functionalised by an alkyl group having from 8 to 22 carbon atoms, or an alkyl group having from 8 to 22 carbon atoms, and preferentially an alkyl group having from 8 to 22 carbon atoms.

This method is also characterised in that a first step of introducing into water compounds d) and the said surfactants other than the compounds d) is accomplished, followed by a second step of increasing the temperature of the medium, followed by a third step of introducing polymerization initiators, and then monomers, possibly added in combination with water and surfactants other than compounds d).

This method is also characterised in that the surfactants other than compounds d) are chosen from among the anionic surfactants, and preferentially from among sodium dodecyl sulphate, dioctyl sodium sulfosuccinate, sodium dodecylbenzenesulfonate, the non-ionic surfactants, and preferentially the ethers of fatty alcohols and of polyoxyethylene glycol, the esters of polyoxyethylene glycol and the blends of these surfactants.

This method is also characterised in that the mass % of surfactants other than d)/polymer is between 1% and 5%.

This method is also characterised in that the said polymerization uses, as a % by weight, compared to the total weight of the said associative thickening agent:
  a) 20% to 60% by weight of at least one monomer which is (meth)acrylic acid, and preferentially methacrylic acid,
  b) 40% to 80% of at least one monomer which is an ester of (meth)acrylic acid, and preferentially ethyl acrylate,
  c) 0.5% to 25% of at least one monomer having a hydrophobic group,
  d) 0.1% to 10% by weight of at least one polyglycerol of formula (I),

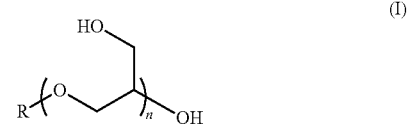

where n represents any number, integer or decimal higher than 1 and equal or lower than 10 and designates the average degree of polymerization; R designates hydrogen, or an ester group functionalised by the alkyl group, having from 8 to 22 carbon atoms, or an alkyl group having from 8 to 22 carbon atoms, and preferentially an alkyl group having from 8 to 22 carbon atoms, where the sum of the percentages a), b), c) and d) is equal to 100%.

This method is also characterised in that the monomer containing at least one hydrophobic group has the general formula R-$(EO)_p$—$(PO)_q$—R', where:
  p and q designate integers of less than or equal to 150, at least one of which is non-zero, with preferentially q=0 and 0<p<80,
  EO and PO designate respectively ethylene oxide and propylene oxide, positioned in a random or regular manner,
  R designates a polymerizable group, and preferentially the methacrylate or methacrylurethane group,
  R' designates a hydrophobic group having at least 6 and at most 36 carbon atoms.

This method is also characterised in that the said associative thickening agent has an average molecular mass by weight of between 20,000 g/mole and 1,000,000 g/mole, as measured by GPC.

Another object of the present invention lies in an associative thickening agent, such as the one obtained by the method according to the present invention.

Another object of the present invention consists in the use of such a thickening agent, as an agent to improve the open time of an aqueous formulation or an adhesive, where the said aqueous formulation is preferentially a water-based paint, a roughcast paint or a render.

Another object lies in the use of polyglycerol of formula (I) as polymerization surfactants.

A final object of the present invention lies in the aqueous formulation or adhesive containing the said thickening agent, where the said aqueous formulation is preferentially a water-based paint, a roughcast paint or a render.

The following examples will enable the present invention to be better apprehended, without however limiting its scope.

EXAMPLES

In each of the following examples, the molecular mass of the associative thickening agents is determined by GPC.

Synthesis of the said thickening agents is well known to the skilled man in the art, and reference may be made in particular to the various documents cited in the Application as background concerning HASE technology.

The paints are formulated using the methods well known to the skilled man in the art. All the Brookfield™ viscosities of the paint formulations are measured at 25° C.

Finally, the open time of the paints is determined using 2 techniques, depending on whether a thin film or a thick film of moist paint is applied.

When a thin film is concerned, the open time is measured by means of a test undertaken in a controlled atmosphere (climate-controlled room), where the time when the first layer is no longer diluted is determined on a freshly applied film, by successive repeats.

In concrete terms, in a climate-controlled room with the temperature set at 23±1° C. and with 50% relative humidity, 240 μm of a paint having cured for at least 24 h is applied using a multi-layer applicator on a black Leneta card (wet abrasion card). The chronometer is then started and this card is attached with adhesive tape to a Placoplatre™ plate; a check is made that the length of the adhesive strip is equal to the width of the card.

After 15 min. one begins to sweep the surface of the still-wet film with a "30" brush from left to right over a 3 cm strip; a proportion of the paint is thus moved with the brush to the unpainted surface on the right.

This operation is undertaken every minute, taking care to use a brush which is always dry, and always to apply the same pressure.

The sweeping is stopped when it is no longer possible to move paint rightwards. From that point forth, the Leneta card moves when the brush moves over it: this is the instant when the film can no longer be soaked; consequently the brush no longer slides. This instant is the open time.

When a thick film is concerned, the open time is determined indirectly by means of a spreading test.

In a climate-controlled room with a temperature set at 23±1° C. and with hygrometry controlled at 50±5%, a determined quantity in terms of shape and volume of the product to be tested is applied on a Placoplatre™ plate using a jig.

This jig consists of a trapezoid-shaped stainless steel frame (with no background) of a thickness ranging from 0 to 14 mm, with a large base B=72 mm, a small base b=58 mm and a height h=150 mm. The depth is 0 mm for B and 14 mm for b and varies in linear proportion. This jig is attached to the Placoplatre™ plate, with the larger base upward.

The product is placed inside until the jig is filled completely. The surplus product is removed by levelling-off using a wall scraper of width greater than B, so as to position the product perfectly and such that it perfectly follows the shape of the jig.

The latter is then removed (mould release), taking care to leave nothing on the edges of the frame. The product settles to a greater or lesser degree during the drying time. The spreading amplitude is measured in the widest location 24 hours after application. It is expressed as a percentage of the additional spreading proportion relative to the width of the jig. It is considered that the larger the amplitude the greater the open time of the thick film.

Example 1

This example illustrates the synthesis and use of the various associative thickening agents according to the invention (presence of polyglycerol during the synthesis), or outside the invention (without additives, with glycerol used during the synthesis or as a formulation agent, with polyglycerol added as a formulation surfactant).

The use in question occurs in a water-based paint, the constitution of which is given in table 1, the figures indicate the mass in grams of each constituent.

TABLE 1

| | |
|---|---|
| Water | 294.0 |
| Ammonia 31% | 2.0 |
| Ecodis 40 (Coatex ™) | 3.0 |
| Acticide MBS (Thor ™) | 2.0 |
| Byk ™ 34 (Byk ™) | 1.0 |
| TiONA ™ 568 (Cristal ™) | 41.0 |
| Durcal 5 (Omya ™) | 328.0 |
| Omyacoat ™ 850 OG (Omya ™) | 215.0 |
| Axilat ™ DS 910 (Hexion ™) | 82.0 |
| Butyl diglycol | 20.0 |
| Thickening agent subject to testing | 12.0 * |

* the value of 12 grams is equal to the mass of an emulsion containing 30% by dry weight of polymer (except for test n° 4 which uses 9.0 grams by dry weight of a commercial thickening agent in powder form).

Test No 1:

This test illustrates a HASE thickening agent outside the invention, polymerized with a conventional surfactant.

This thickening agent results from the synthesis, expressed as a % by weight of the monomers, of:
a) 37.4% of methacrylic acid,
b) 54.3% of ethyl acrylate,
c) 8.3% of a monomer of formula (I), with:
R designates the methacrylate group,
q=0, p=25,
R' designates the hydrophobic group resulting from oxo alcohol having 16 carbon atoms.

In a 1-liter reactor, 485.4 grams of bipermuted water and 6.66 grams of sodium dodecyl sulphate and 11.5 g of non-ionic surfactant, which is isotridecyl alcohol condensed with 3 molecules of ethylene oxide, are weighed. The base of the tank is then heated to 72° C.±2° C.

During this time, a pre-emulsion is prepared by weighing the following in a beaker:
149 grams of bipermuted water,
2.33 grams of sodium dodecyl sulphate,
111.33 grams of methacrylic acid,
161.45 grams of ethyl acrylate, 24.6 grams of macromonomer of formula (I).

The mass of non-ionic surfactant therefore accounts in this case for 3.7% of the total mass of the manufactured polymer.

0.95 gram of ammonium persulphate is then weighed, diluted in 10 grams of bipermuted water for the first catalyst, and 0.095 gram of sodium metabisulphite diluted in 10 grams of bipermuted water for the second catalyst. When the base of the tank is at the required temperature both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test No 2:

This test illustrates a HASE thickening agent outside the invention, polymerized with a conventional surfactant.

This is the same thickening agent as that of test no 1, in which the non-ionic surfactant has been replaced, in mass terms, by nonylphenol condensed with 4 molecules of ethylene oxide.

Test No 3:

This test illustrates a HASE thickening agent outside the invention, polymerized with a conventional surfactant.

This is the same thickening agent as that of test no 1, in which the non-ionic surfactant has been replaced, in mass terms, by a surfactant sold by the company Clariant™ under the name Polyglykol™ B11/150.

Test No 4:

This test illustrates an HEC-type thickening agent outside the invention which is Natrosol™ 250 HR (Aqualon™); it is used as a reference.

Test No 5:

This test illustrates a thickening agent outside the invention, formulated in water with the introduction of glycerol after polymerization.

The thickening agent is that of test no 1, polymerized according to the technique described in test no 1.

In the final solution with 30% by dry weight of active matter, 3% by dry weight of glycerol from the company Oleon™ relative to the dry weight of polymer is introduced.

Test No 6:

This test illustrates a thickening agent outside the invention, formulated in water with the introduction of polyglycerol after polymerization.

The thickening agent is that of test no 1, polymerized according to the technique described in test no 1.

In the final solution with 30% by dry weight of active matter, 3% by dry weight, relative to the dry weight of polymer, of polyglycerol-3 of formula (I), with R=H, and n=3 sold by the company Solvay™, is introduced.

Test No 7:

This test illustrates a thickening agent outside the invention, formulated in water with the introduction of polyglycerol after polymerization.

The thickening agent is that of test no 1, polymerized according to the technique described in test no 1.

In the final solution with 30% by dry weight of active matter, 3% by dry weight, relative to the dry weight of polymer, of hydrophobic polyglycerol, which is Chimexane™ NB of formula (I) with R=$C_{18}H_{35}$ and n=2 sold by the company Chimex™, is introduced.

Test No 8:

This test illustrates a thickening agent outside the invention, polymerized in the presence of glycerol.

The thickening agent is that of test no 1, polymerized according to the technique described in test no 1, except that the non-ionic polymerization surfactant has been substituted, in mass terms, by glycerol from the company Oleon™.

Test No 9:

This test illustrates a thickening agent according to the invention, polymerized in the presence of polyglycerol-3, which is the one used in test no 6.

The thickening agent is that of test no 1, polymerized according to the technique described in test no 1, except that the non-ionic polymerization surfactant has been substituted, in mass terms, by the polyglycerol-3 of test no 6.

Test No 10:

This test illustrates a thickening agent according to the invention, polymerized in the presence of Chimexane™ NB, which is the one used in test no 7.

The thickening agent is that of test no 1, polymerized according to the technique described in test no 1, except that the non-ionic polymerization surfactant has been substituted, in mass terms, by the Chimexane™ NB of test no 7.

For each of these tests the Brookfield™ viscosities were determined at 25° C., at 10 and 100 revolutions per minute, at instant t=1 day ($\mu_{10\ 1J}$, $\mu_{100\ 1J}$), where instant t=0 is the time of manufacture of the paint.

The open time of the paint expressed in minutes using the protocol set out in the preamble for a thin film is also determined, at instant t=1 day.

The results are shown in table 2.

TABLE 2

| Test n° | 1 | 2 | 3 | 4 | 5 |
|---|---|---|---|---|---|
| REFerence Outside Invention | OI | OI | OI | REF | OI |
| INvention | | | | | |
| $\mu_{10\ 1J}$ (mPa · s) | 6,600 | 6,500 | 6,800 | 5,500 | 5,600 |
| $\mu_{100\ 1J}$ (mPa · s) | 2,600 | 2,700 | 2,800 | 2,000 | 2,200 |
| open time (min.) | 33 | 33 | 33 | 35 | 34 |

| Test n° | 6 | 7 | 8 | 9 | 10 |
|---|---|---|---|---|---|
| REFerence Outside Invention | OI | OI | OI | IN | IN |
| INvention | | | | | |
| $\mu_{10\ 1J}$ (mPa · s) | 6,200 | 6,400 | 9,100 | 10,500 | 5,000 |
| $\mu_{100\ 1J}$ (mPa · s) | 2,700 | 2,800 | 3,600 | 3,800 | 2,100 |
| open time (min.) | 34 | 34 | 34 | 36 | 37 |

Tests no 1 to 3 demonstrate that the choice of a habitual polymerization surfactant has no influence on the open time.

When glycerol or polyglycerols are used as the formulation surfactant (tests no 5 to 8), the influence on the open time is minimal.

Test no 4 demonstrates that a modified cellulose indeed enables the open time to be increased; a substantial mass of it must however be used (9 grams of active product, compared to 3.6 grams of active product of the 12 grams of emulsion at 30% dry extract) to obtain levels of viscosity comparable to those obtained with HASE-type emulsions.

Only tests no 9 and 10 (use of polyglycerols during the polymerization step) lead to a significant increase of the open time, with unchanged thickening efficacy. The greatest open time is obtained for test no 10, which is the preferential variant of the invention.

Example 2

This example illustrates the synthesis and use of different associative thickening agents, according to the invention (presence of polyglycerol during the synthesis), or outside the invention (without addition of polyglycerol during the synthesis).

The use occurs in a water-based paint, the constitution of which is given in table 3; the figures indicate the mass in grams of each constituent.

TABLE 3

| | |
|---|---|
| Water | 281.0 |
| Ammonia 31% | 2.0 |
| Ecodis 40 (Coatex ™) | 3.0 |
| Acticide MBS (Thor ™) | 2.0 |
| Byk ™ 34 (Byk ™) | 1.0 |
| TiONA 568 (Cristal ™) | 41.0 |
| Durcal 5 (Omya ™) | 328.0 |
| Omyacoat ™ 850 OG (Omya ™) | 215.0 |
| Axilat ™ DS 910 (Hexion ™) | 82.0 |
| Butyl diglycol | 20.0 |
| Thickening agent subject to testing | 24.0 * |

* the value of 24 grams is the mass of an emulsion containing 30% by dry weight of polymer.

Test No 11:

This test illustrates a HASE thickening agent outside the invention, polymerized with a conventional surfactant.

This thickening agent results from the synthesis, expressed as a % by weight of the monomers, of:
a) 33.7% of methacrylic acid,
b) 59.4% of ethyl acrylate,
c) 6.9% of a monomer of formula (I), with:
  R designates the methacrylate group,
  q=0, p=25,
  R' designates the branched hydrophobic group with 16 carbon atoms.

In a 1-liter reactor, 288 grams of bipermuted water, 3.5 grams of sodium dodecyl sulphate and 11.5 g of non-ionic surfactant, which is isotridecyl alcohol condensed with 3 molecules of ethylene oxide, are weighed. The base of the tank is then heated to 72° C.±2° C.

During this time, a pre-emulsion is prepared by weighing the following in a beaker:
285 grams of bipermuted water,
3.5 grams of sodium dodecyl sulphate,
102.06 grams of methacrylic acid,
180 grams of ethyl acrylate,
21 grams of macromonomer of formula (I),
0.64 gram of dodecylmercaptan.

The mass of non-ionic surfactant therefore accounts in this case for 3.6% of the total mass of the manufactured polymer.

0.95 gram of ammonium persulphate is then weighed, diluted in 10 grams of bipermuted water for the first catalyst, and 0.095 gram of sodium metabisulphite diluted in 10 grams of bipermuted water for the second catalyst. When the base of the tank is at the required temperature both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test No 12:

This test illustrates a thickening agent according to the invention, polymerized in the presence of polyglycerol-4 sold by the company Solvay™.

The thickening agent is that of test no 11, polymerized according to the technique described in test no 11, except that the non-ionic polymerization surfactant has been substituted, in mass terms, by the polyglycerol-4 of test no 6.

Test No 13:

This test illustrates a thickening agent according to the invention, polymerized in the presence of Chimexane™ NB.

The thickening agent is that of test no 11, polymerized according to the technique described in test no 11, except that the polymerization surfactant has been substituted, in mass terms, by the Chimexane™ NB.

Test No 14:

This test illustrates a HASE thickening agent outside the invention, polymerized with a conventional surfactant.

This thickening agent results from the synthesis, expressed as a % by weight of the monomers, of:
a) 35.57% of methacrylic acid,
b) 52.43% of ethyl acrylate,
c) 12% of a monomer of formula (I), with:
  R designates the methacrylate group,
  q=0, p=30,
  R' designates the hydrophobic group consisting of 12 carbon atoms and derived from ethoxylation of an oxo alcohol consisting of 12 carbon atoms.

In a 1-liter reactor, 485.4 grams of bipermuted water and 6.66 grams of sodium dodecyl sulphate and 11.5 g of a surfactant sold by the company Clariant™ under the name Polyglykol™ B11/150 are weighed. The base of the tank is then heated to 72° C.±2° C.

During this time, a pre-emulsion is prepared by weighing the following in a beaker:
149 grams of bipermuted water,
0.33 gram of sodium dodecyl sulphate,
105.8 grams of methacrylic acid,
155.9 grams of ethyl acrylate,
35.7 grams of macromonomer of formula (I).

The mass of surfactant therefore accounts in this case for 3.7% of the total mass of the manufactured polymer.

0.95 gram of ammonium persulphate is then weighed, diluted in 10 grams of bipermuted water for the first catalyst, and 0.095 gram of sodium metabisulphite diluted in 10 grams of bipermuted water for the second catalyst. When the base of the tank is at the required temperature both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test No 15:

This test illustrates a thickening agent according to the invention, polymerized in the presence of polyglycerol-4 of the company Solvay™.

The thickening agent is that of test no 14, polymerized according to the technique described in test no 14, except that the non-ionic polymerization surfactant has been substituted, in mass terms, by polyglycerol-4.

Test No 16:

This test illustrates a thickening agent according to the invention, polymerized in the presence of Chimexane™ NB sold by the company Chimex™.

The thickening agent is that of test no 14, polymerized according to the technique described in test no 14, except that the non-ionic polymerization surfactant has been substituted, in mass terms, by the Chimexane™ NB.

For each of these tests, the Brookfield™ viscosities were determined at 25° C., at 10 and 100 revolutions per minute, at instant t=1 day ($\mu_{10\ 1J}$, $\mu_{100\ 1J}$), where instant t=0 is the time of manufacture of the paint.

The open time of the paint expressed in minutes using the protocol set out in the preamble for a thin film is also determined, at instant t=1 day.

The results are shown in table 4.

TABLE 4

| Test n° | 11 | 12 | 13 |
|---|---|---|---|
| REFerence Outside Invention INvention | OI | IN | IN |
| $\mu_{10\ LJ}$ (mPa·s) | 7,700 | 8,500 | 8,200 |
| $\mu_{100\ LJ}$ (mPa·s) | 2,700 | 2,900 | 3,000 |
| open time (min.) | 30 | 32 | 34 |

| Test n° | 14 | 15 | 16 |
|---|---|---|---|
| REFerence Outside Invention INvention | OI | IN | IN |
| $\mu_{10\ LJ}$ (mPa·s) | 7,300 | 7,000 | 7,100 |
| $\mu_{100\ LJ}$ (mPa·s) | 3,000 | 2,400 | 2,500 |
| open time (min.) | 29 | 31 | 33 |

If tests no 12 and 13 are compared with test no 11, and tests no 15 and 16 with test no 14, it can be ascertained that the use of polyglycerols according to the invention, during the polymerization step, enables the open time to be increased appreciably, without affecting the thickening power.

The longest open times are obtained for tests no 13 and 16, which are the preferential variant of the invention.

Example 3

This example illustrates the synthesis and use of different associative thickening agents, according to the invention (presence of polyglycerol during the synthesis), or outside the invention (without addition of polyglycerol during the synthesis).

The use in question occurs in a water-based thick coating, the constitution of which is given in table 5, the figures indicate the mass in grams of each constituent.

TABLE 5

| Water | 258.5 |
|---|---|
| Ammonia 31% | 2.5 |
| Ecodis 40 (Coatex ™) | 3.0 |
| Mergal K6N | 2.0 |
| Nopco ™ NDW | 1.0 |
| Durcal 130 (Omya ™) | 380.0 |
| Durcal 2 (Omya ™) | 200.0 |
| Axilat ™ DS 910 (Hexion ™) | 40.0 |
| Thickening agent subject to testing | 14.0 * |

* the value of 14 grams is equal to the mass of an emulsion containing 30% by dry weight of polymer (except for test n° 18 which uses 9.0 grams of Natrosol in powder form).

Test No 17:

This test illustrates a HASE thickening agent outside the invention, polymerized with a conventional surfactant.

This thickening agent results from the synthesis, expressed as a % by weight of the monomers, of:

a) 37.1% of methacrylic acid,
b) 52.9% of ethyl acrylate,
c) 10% of a monomer of formula (I), with:
  R designates the methacrylate group,
  q=0, p=35,
  R' designates the branched hydrophobic group having 20 carbon atoms.

In a 1-liter reactor, 473.55 grams of bipermuted water and 4.42 grams of sodium dodecyl sulphate and 11 g of non-ionic surfactant, which is isotridecyl alcohol condensed with 3 molecules of ethylene oxide, are weighed. The base of the tank is then heated to 72° C.±2° C.

During this time, a pre-emulsion is prepared by weighing the following in a beaker:

116 grams of bipermuted water,
108.14 grams of methacrylic acid,
153.75 grams of ethyl acrylate,
29 grams of macromonomer of formula (I).

The mass of non-ionic surfactant therefore accounts in this case for 3.6% of the total mass of the manufactured polymer.

0.95 gram of ammonium persulphate is then weighed, diluted in 10 grams of bipermuted water for the first catalyst, and 0.095 gram of sodium metabisulphite diluted in 10 grams of bipermuted water for the second catalyst. When the base of the tank is at the required temperature, both catalysts are added, and polymerization is effected for 2 hours at 76° C.±2° C., with simultaneous addition of the pre-emulsion. The pump is rinsed with 20 grams of bipermuted water, and is fired for 1 hour at 76° C.±2° C. Finally it is cooled to ambient temperature, and the dispersion obtained in this manner is filtered.

Test No 18:

This test illustrates an HEC-type thickening agent outside the invention which is Natrosol™ 250 HR (Aqualon™); it is used as a reference.

Test No 19:

This test illustrates a thickening agent according to the invention, polymerized in the presence of Chimexane™ NB sold by the company Chimex™.

The thickening agent is that of test no 17, polymerized according to the technique described in test no 17, except that the non-ionic polymerization surfactant has been substituted, in mass terms, by the Chimexane™ NB.

Test No 20:

This test illustrates a thickening agent according to the invention, polymerized in the presence of Chimexane™ NC sold by the company Chimex™.

The thickening agent is that of test no 17, polymerized according to the technique described in test no 17, except that the non-ionic polymerization surfactant has been substituted, in mass terms, by the Chimexane™ NC of formula (I) with R=$C_{18}H_{35}$ and n=4.

Test No 21:

This test illustrates a thickening agent according to the invention, polymerized in the presence of Chimexane™ NB sold by the company Chimex™.

The thickening agent is that of test no 17, polymerized according to the technique described in test no 17, except that the polymerization surfactant has been substituted (twice the mass) by the Chimexane™ NB.

For each of these tests, the Brookfield™ viscosities were determined at 25° C., at 10 and 100 revolutions per minute, at instant t=1 day ($\mu_{10\ LJ}$, $\mu_{100\ LJ}$), where instant t=0 is the time of manufacture of the thick coating.

The open time of the thick coating using the protocol set out in the preamble for a thick film is also determined, at instant t=1 day.

The results are shown in table 6.

TABLE 6

| Test n° | 17 | 18 | 19 | 20 | 21 |
|---|---|---|---|---|---|
| REFerence Outside Invention INvention | OI | REF | IN | IN | IN |
| $\mu_{10\ 1J}$ (Pa · s) | 109 | 83 | 103 | 88 | 112 |
| $\mu_{100\ 1J}$ (Pa · s) | 27 | 30 | 26 | 23 | 30 |
| open time (% of extension) | 60 | 120 | 103 | 95 | 122 |

These results demonstrate that the thickening agents according to the invention (tests n° 19 to 21) enable the open time to be increased, relative to the reference, whilst retaining a satisfactory thickening power.

Test no 21 even enables the open time as obtained with the reference product according to test no 18 to be improved (but with only 4.2 grams of active product, compared to 9.0 grams for the HEC-type product).

The invention claimed is:

1. A method for manufacturing an associative thickening agent, the method comprising polymerizing, in an aqueous dispersion, monomers a), b) and c):

a) (meth)acrylic acid, b) an ester of (meth)acrylic acid, and c) a monomer having a formula $R\text{-}(EO)_p\text{-}(PO)_q\text{-}R'$, where:

p and q designate integers of less than or equal to 150, at least one of which is non-zero, EO and PO designate respectively ethylene oxide and propylene oxide, R designates a polymerizable group, and R' designates a hydrophobic group comprising from 6 to 36 carbon atoms, wherein the polymerizing is performed in the presence of at least one polyglycerol of formula (I) and in the presence of a surfactant other that the polyglycerol of formula (I)

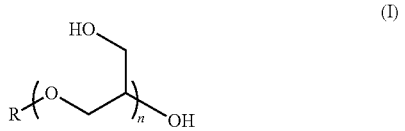

(I)

where:

n represents an integer or decimal greater than 1 and equal to or lower than 10 and designates an average degree of polymerization; and R designates hydrogen, an ester group functionalized by an alkyl group having from 8 to 22 carbon atoms, or an alkyl group having from 8 to 22 carbon atoms, to obtain an associative thickening agent.

2. The method according to claim 1, comprising:
(i) introducing into water the polyglycerol of formula (I) and the surfactant other than the polyglycerol of formula (I), to form a mixture, then
(ii) increasing a temperature of the mixture, then
(iii) introducing a polymerization initiator to the mixture, and then
(iv) adding the monomers a), b) and c) to the mixture, optionally in combination with water and an additional surfactant.

3. The method according to claim 1, wherein the surfactant other than the polyglycerol of formula (I) is an anionic surfactant, a non-ionic surfactant, or a mixture thereof.

4. The method according to claim 1, wherein the surfactant other than the polyglycerol of formula (I) is present in an amount of 1% to 5%.

5. The method according to claim 1, wherein, compared to a total weight of the associative thickening agent:
20% to 60% by weight of the (meth)acrylic acid a),
40% to 80% of the ester of (meth)acrylic acid b),
0.5% to 25% of the monomer having a formula $R\text{-}(EO)_p\text{-}(PO)_q\text{-}R'c$), and
0.1% to 10% by weight of the polyglycerol of formula (I) d), are present during the polymerizing,
where the sum of the percentages a), b), c) and d) is equal to 100%.

6. The method according to claim 1, wherein R' designates a hydrophobic group having from 12 and 36 carbon atoms.

7. The method according to claim 1, wherein the obtained associative thickening agent has an average molecular mass by weight of between 20,000 g/mole and 1,000,000 g/mole, as measured by GPC.

8. The method according to claim 1, wherein the monomer a) is methacrylic acid.

9. The method according to claim 1, wherein the monomer b) is ethyl acrylate.

10. The method according to claim 1, wherein the surfactant other than the polyglycerol of formula (I) is at least one member selected from the group consisting of sodium dodecyl sulfate, dioctyl sodium sulfosuccinate, sodium dodecylbenzenesulfonate, an ether of a fatty alcohol, an ether of polyoxyethylene glycol, and an ester of polyoxyethylene glycol.

11. The method according to claim 1, wherein q=0 and 0<p<80.

12. The method according to claim 1, wherein R is a methacrylate group.

13. The method according to claim 1, wherein R is a methacrylurethane group.

14. The method according to claim 1, wherein:
the monomer a) is methacrylic acid;
the monomer b) is ethyl acrylate;
q=0 and 0<p<80;
R is a methacrylate group or a methacrylurethane group;
R' designates a hydrophobic group having from 12 and 36 carbon atoms; and
the surfactant other than the polyglycerol of formula (I) is at least one member selected from the group consisting of sodium dodecyl sulfate, dioctyl sodium sulfosuccinate, sodium dodecylbenzenesulfonate, an ether of a fatty alcohol, an ether of polyoxyethylene glycol, and an ester of polyoxyethylene glycol.

* * * * *